US007346487B2

(12) United States Patent
Li (10) Patent No.: US 7,346,487 B2
(45) Date of Patent: Mar. 18, 2008

(54) METHOD AND APPARATUS FOR IDENTIFYING TRANSLATIONS

(75) Inventor: Hang Li, Beijing (CN)

(73) Assignee: Microsoft Corporation, Redmond, WA (US)

(*) Notice: Subject to any disclaimer, the term of this patent is extended or adjusted under 35 U.S.C. 154(b) by 866 days.

(21) Appl. No.: 10/626,455

(22) Filed: Jul. 23, 2003

(65) Prior Publication Data

US 2005/0021323 A1    Jan. 27, 2005

(51) Int. Cl.
*G06F 17/28* (2006.01)
*G06F 17/21* (2006.01)
*G10L 11/00* (2006.01)

(52) U.S. Cl. .............................. 704/2; 704/10; 704/277
(58) Field of Classification Search ..................... None
See application file for complete search history.

(56) References Cited

U.S. PATENT DOCUMENTS

| 6,119,078 | A  | * | 9/2000  | Kobayakawa et al. | 704/3   |
|-----------|----|---|---------|-------------------|---------|
| 6,598,015 | B1 | * | 7/2003  | Peterson et al.   | 704/3   |
| 6,857,022 | B1 | * | 2/2005  | Scanlan           | 709/229 |
| 6,885,985 | B2 | * | 4/2005  | Hull              | 704/2   |
| 7,103,531 | B2 | * | 9/2006  | Moore             | 704/5   |
| 7,107,204 | B1 | * | 9/2006  | Liu et al.        | 704/2   |
| 2001/0029455 | A1 | * | 10/2001 | Chin et al.    | 704/277 |
| 2002/0138250 | A1 | * | 9/2002  | Okura et al.   | 704/2   |
| 2002/0161569 | A1 | * | 10/2002 | Itoh et al.    | 704/2   |
| 2003/0009320 | A1 | * | 1/2003  | Furuta         | 704/2   |

OTHER PUBLICATIONS

Cao et al., "Base Noun Phrase translation using web data and the EM algorithm", Proceedings of the 19th international conference on Computational linguistics, vol. 1, pp. 1-7, 2002.*
Brill E., Lin J., Banko M., Dumais S. and Ng A. (2001) *Data-Intensive Questions Answering*. In Proc. of TREC '2001.
Brown P.F., Della Pietra, S.A., Della Pietra V.J., and Mercer, R.L. (1993) *The mathematics of Statistical Machine Translation: parameter Estimation*. Computational Linguistics 19(2), pp. 263-311.
Diab M. Finch S. (2000) *A Statistical word-level translation model for comparable corpora*. In Proc. of RIAO.
Fujii A. and Ishikawa T. (2000). *Utilizing the World Wide Web as an Encyclopedia: Extracting Term Descriptions from Semi-Structured Texts*. In Proc. of ACL '2000, pp. 488-495.

(Continued)

*Primary Examiner*—David Hudspeth
*Assistant Examiner*—Brian Albertalli
(74) *Attorney, Agent, or Firm*—Theodore M. Magee; Westman, Champlin & Kelly, P.A.

(57) ABSTRACT

A method for identifying a translation transforms a representation of context words in a source language into a transformed representation of context in a target language based on multiple different translations for at least one context word. Candidate representations of context words in a target language are determined for at least two candidate translations. The transformed representation is used to score each candidate representation and the scores are used to select a candidate translation. In another aspect of the invention, a method and apparatus are provided for updating a translation dictionary by receiving votes from multiple clients as to which translation is correct.

33 Claims, 6 Drawing Sheets

OTHER PUBLICATIONS

Fung P. and Yee L.Y. (1998) *An IR approach for translation new words from nonparallel, comparable texts.* In Proc. of COLING-ACL '1998, pp. 414-420.

Gao J.F., Nie J.Y., Xun E.D., Zhang J., Zhou M. and Huang C.N. (2001) *Improving Query Translation for Cross-Language Information Retrieval Using Statistical Models.* In Proc. of SIGIR '2001.

Koehn P. and Knight K. (2000) *Estimating word translation probabilities from unrelated monolingual corpra using the EM algorithm.* In Proc. of AAAI '2000.

Nagata M., Saito T., and Suzuki K. (2001) *Using the Web as a bilingual dictionary.* In Proc. of ACL '2001 DD-MT Workshop.

Nakagawa H. (2001) *Disambiguation of single noun translations extracted from bilingual comparable corpora.* In Terminology 7:1.

Nie J.Y., Simard M., Isabelle P. and Durand R. (1999) *Cross-Language Information Retrieval based on Parallel Texts and Automatic Mining of Parallel Texts in the Web.* In Proc. of SIGIR '1999.

Rapp R. (1999) *Automatic identification of word translations from unrelated English and German corpora.* IN Proc of ACL '1999.

Resnik P. (1999) *Mining the Web for Bilingual Text.* In Proc. of ACL '1999.

Sumita E. (2000) *Lexical transfer using a vector-space model.* In Proc of ACL '2000.

Tanaka K. and Iwasaki H. (1996) *Extraction of Lexical Translation from non-aligned corpra.* In Proc. of COLING '1996.

Wang, Y. and Waibel, A. (1998) *Modeling with Structures in Statistical Machine Translation.* In Proc. of COLING-ACL '1998.

Xun E.D., Huang C.N. and Zhou M. (2000) *A Unified Statistical Model for the Identification of English BaseNP.* In Proc. of ACL '2000.

Xu, J. and R. Weischedel, *Cross-lingual Information Retrieval using Hidden Markov Models*, In the Proc. of the Joint SIGDAT conference on EMNLP/VLC-2000, 2000.

\* cited by examiner

METHOD AND APPARATUS FOR IDENTIFYING TRANSLATIONS

BACKGROUND OF THE INVENTION

The present invention relates to automatic translation systems. In particular, the present invention relates to translation identification using non-parallel corpora.

In translation systems, a string of characters in one language is converted into a string of characters in another language. One challenge to such translation systems is that it is difficult to construct a dictionary that can provide a translation for every word in the source and target languages. One reason for this is the number of words in the languages, which makes it labor intensive to create such a dictionary. Another reason is that new words are constantly being added to the languages, requiring a large amount of work to keep the dictionary current. The lack of available translations is particularly a problem for multi-word phrases such as the noun phrases "information age" or "information asymmetry" since there are a large number of such phrases and because new phrase are continually being created.

To overcome the work involved in building and updating translation dictionaries, several systems have been created that automatically generate a translation dictionary. Under one set of systems, the translation dictionary is formed using parallel bilingual corpora. In such systems, the same information is written in two different languages. The text in one of the languages is aligned with the text in the other language, typically on a sentence-by-sentence basis. After this alignment is complete, comparisons between the aligned texts are made to identify words that are likely translations of each other.

Although using parallel corpora is an effective technique, obtaining such corpora is difficult in practice. To deal with this difficulty, some systems have proposed using non-parallel corpora. Under such systems, a set of candidate translations are assumed to be given or can be easily collected. The goal of the systems is to select the best candidate from the set of candidates.

To do this, the systems rely on a linguistic phenomenon in which the contexts of a translation for a word in the target language are the same as the contexts of the word in the source language. Thus, these systems identify the best candidate by translating the contexts in the source language into the target language and selecting the candidate translation that has a target language context that best matches the translated context. In one system, the contexts are represented by vectors where each element in the vector represents a word in the context.

One problem with such systems is that they are dependent on an accurate translation of the contexts. In many systems, it is assumed that there is a one-to-one mapping between context words in the source language and context words in the target language and as such, an accurate translation can be achieved by consulting a translation dictionary. However, in reality, there is a many-to-many relationship between words in a source language and words in a target language. As a result, each word in the source context can have multiple translations in the target language. In addition, words in the target context can have several different translations in the source language.

Thus, a system is needed that provides for accurate translations of the contexts while taking into account the many-to-many relationship between words in the source and target languages.

In addition, since all automatic translation dictionary systems are prone to error, it is desirable to develop a system that limits the number of incorrect translations that are entered into the dictionary.

SUMMARY OF THE INVENTION

A method for identifying a translation transforms a representation of context words in a source language into a transformed representation of context in a target language based on multiple different translations for at least one context word. Candidate representations of context words in a target language are determined for at least two candidate translations. The transformed representation is used to score each candidate representation and the scores are used to select a candidate translation.

In another aspect of the invention, a method and apparatus are provided for updating a translation dictionary. Under this aspect of the invention, two possible translations of a source word are provided to at least two clients. Each client provides an indication as to which translation is believed to be correct. The indications are used to select one of the translations for entry in the dictionary.

DETAILED DESCRIPTION OF ILLUSTRATIVE EMBODIMENTS

Figure 1:
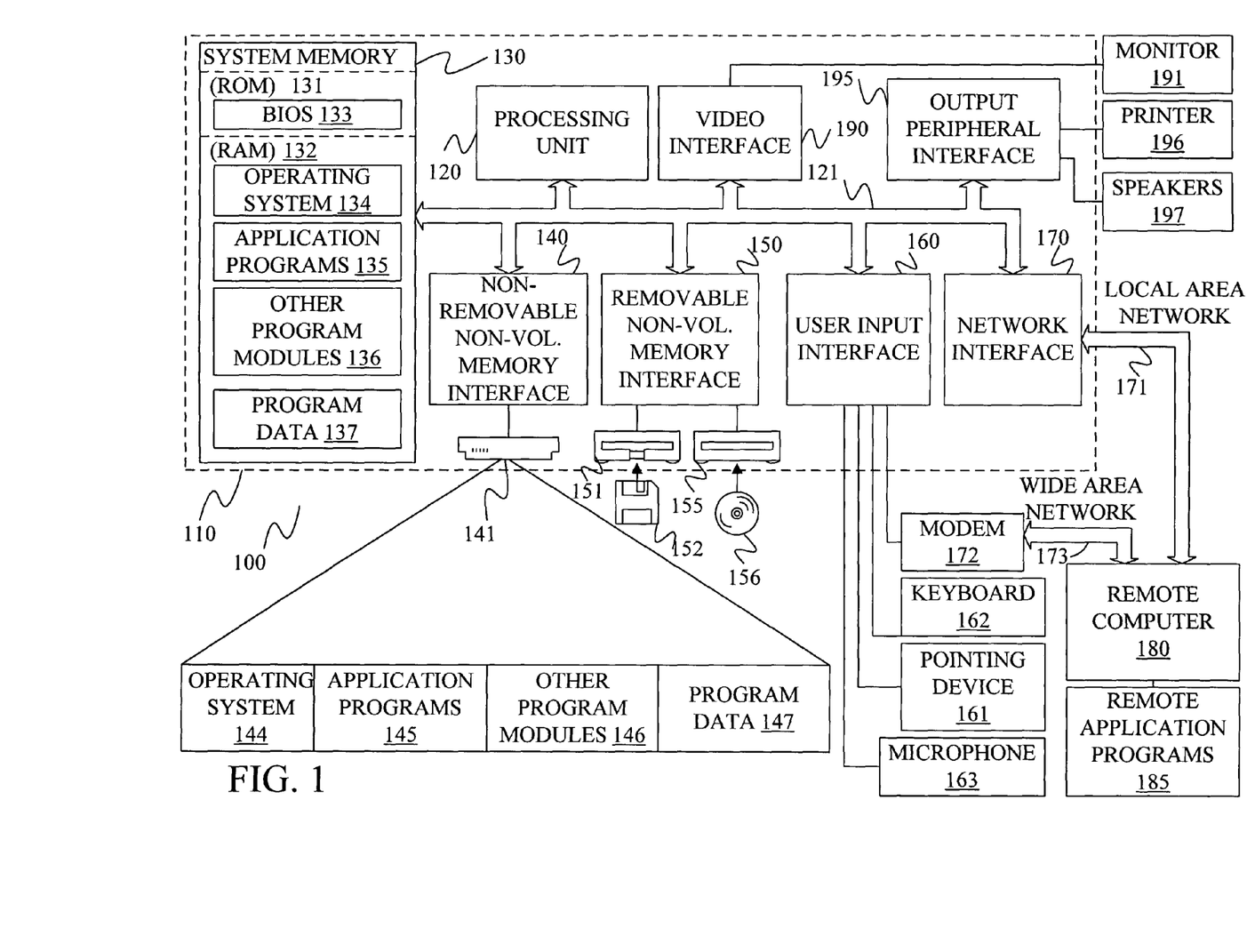
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be, connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

The present invention provides a method and apparatus for identifying translations for words and phrases using two non-parallel corpora. In on aspect of the invention, the present invention uses the Expectation-Maximization algorithm to train translations of context vectors. The translations of context vectors are compared to context vectors in the target language to select a translation for a source word from a set of candidates in the target language. The method of one embodiment of this aspect of the invention is shown in the flow diagram of FIG. 2 and an embodiment of the apparatus is shown in the block diagram of FIG. 3.

A second aspect of the present invention receives user feedback before updating a translation dictionary. In particular, this aspect of the invention receives feedback from multiple users relative to a set of candidate translations. Candidate translations that receive more than a threshold amount of votes are entered into the translation dictionary. A method for practicing this aspect of the invention is shown in the flow diagram of FIG. 4 and a system for performing this aspect of the invention is shown in the block diagram of FIG. 5.

Returning to FIGS. 2 and 3 and the method of selecting a translation using the Expectation-Maximization algorithm, the process of FIG. 2 begins at step 200 where a phrase or word that needs to be translated is identified. Under one embodiment, this is done by a user, but in other embodiments it can be done by an automatic translation system that is unable to find a translation for a phrase or word. For simplicity, the word or phrase that needs to be translated is referred to as the source phrase below.

Figure 2:
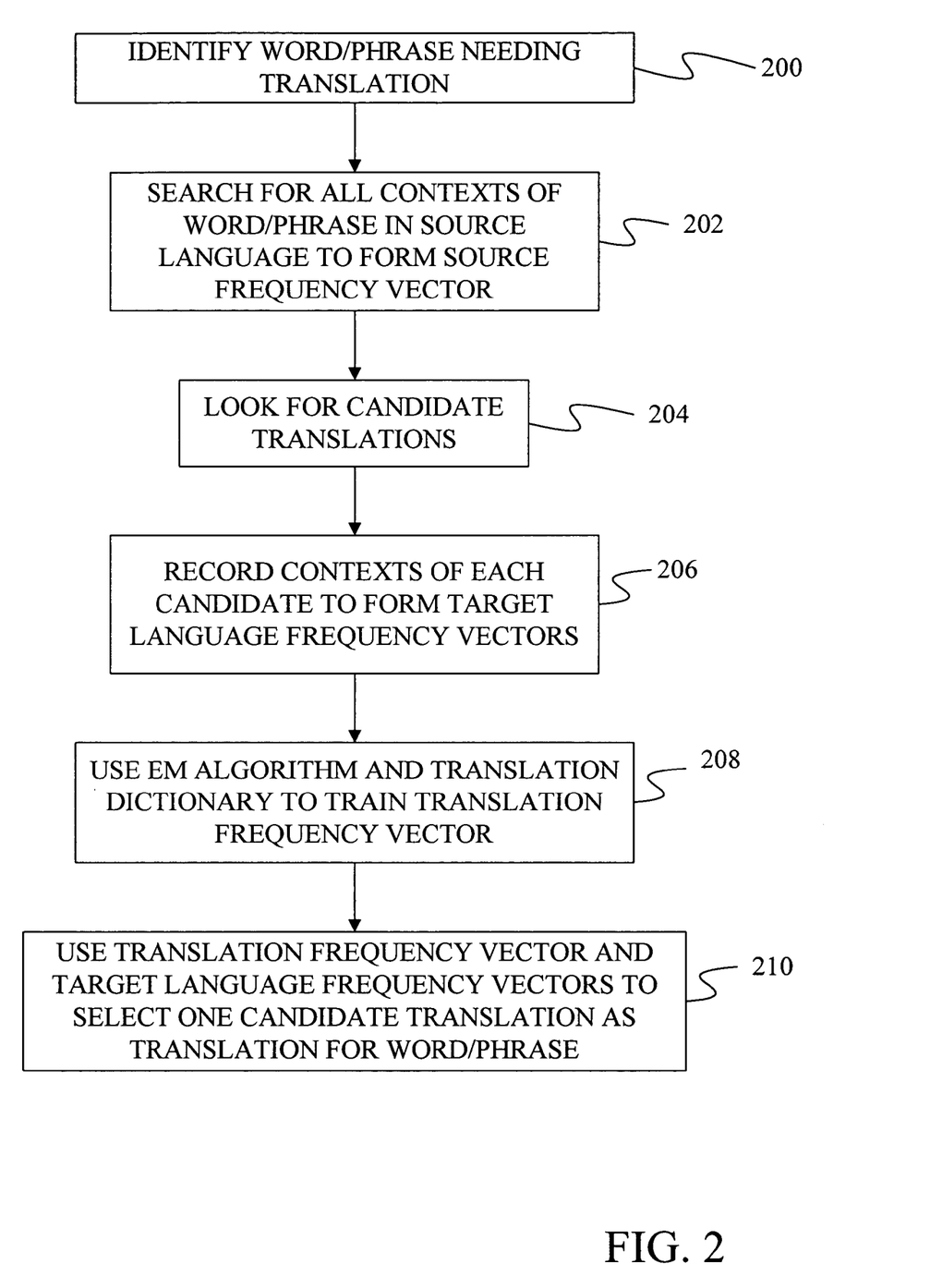
FIG. 2 is a flow diagram of a method of identifying translations using non-parallel corpora under the present invention.
Figure 3:
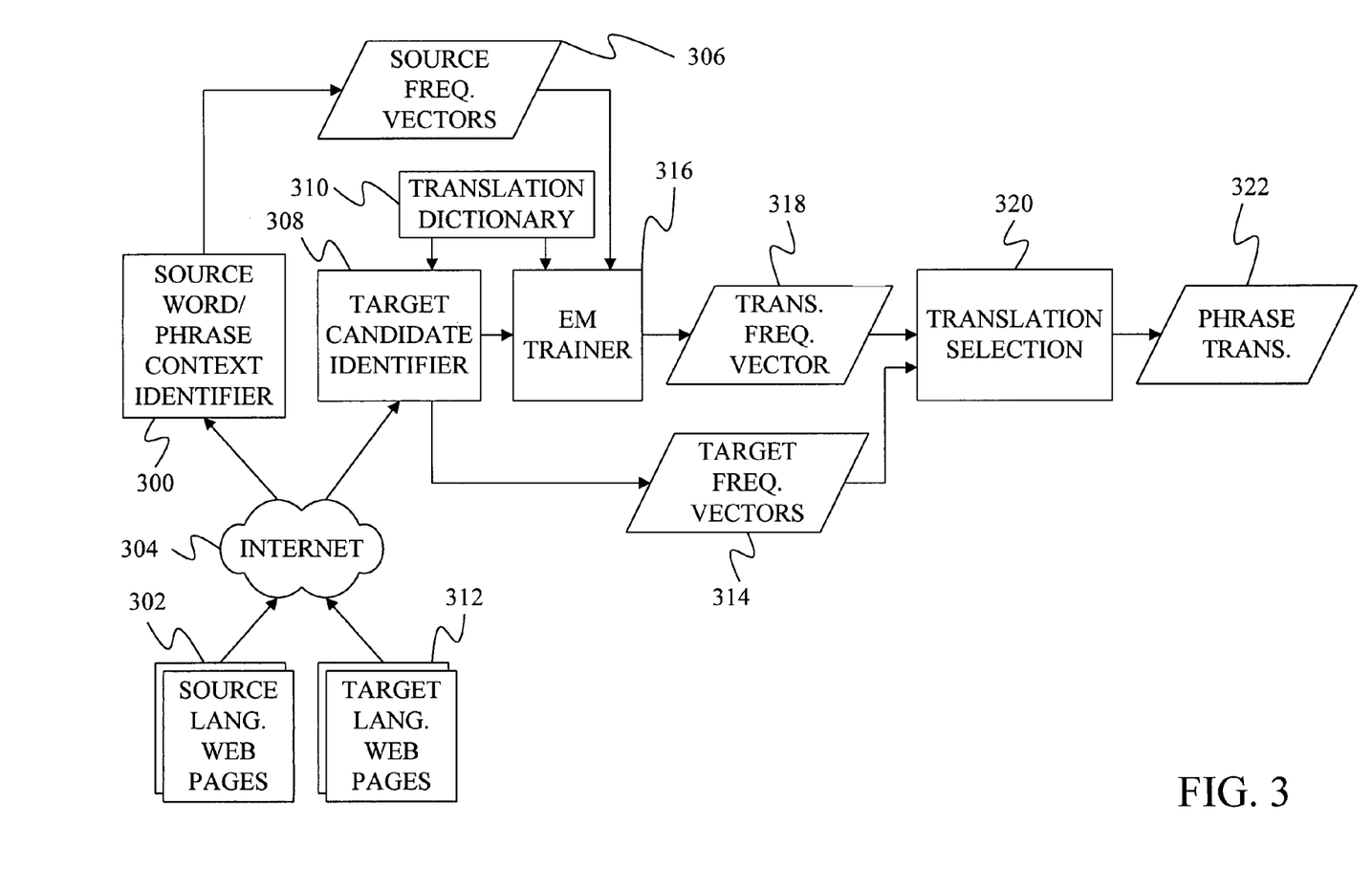
FIG. 3 is a block diagram of a system for identifying translations using non-parallel corpora under the present invention.

At step 202, a search is performed by a context identifier 300 to find examples of the source phrase in a corpus. Under one embodiment, the corpus consists of web pages 302 written in the source language that are available through a network connection such as Internet 304. In other embodiments, the corpus can consist of documents located on an intranet or within a single computer.

Based on the occurrences of the source phrase found by context identifier 300, one or more source frequency vectors 306 are constructed from the context words surrounding the source phrase. Under one embodiment, a single context vector is generated with each element in the vector representing a single context word and providing the number of times the word was found as a context word for the source phrase. For example, if the source phrase is "car wash" and the word "wax" is found twenty times as a context word for the phrase "car wash", one element of the source frequency vector will be a value of twenty for the word "wax".

A word is considered a context word for the source phrase if it is found within a window of words around the source phrase. The number of words in the window, known as the context length, is a matter of design choice.

In other embodiments, a separate source frequency vector is generated for each of a plurality of context lengths. For example, if one context length is ten words and another context length is fifteen words, one source frequency vector will be produced for the ten-word context and one source frequency vector will be produced for the fifteen-word context.

At step 204, a set of target candidate translations representing possible translations for the source phrase is identified by a target candidate identifier 308. Under one embodiment, where the source phrase consists of multiple words, the target candidates are identified by identifying all of the possible translations for each of the words in the source phrase using translation dictionary 310. For example, if the source phrase is "information age" and "information" has a single translation A, and "age" has three, translations B(how old someone is), C(historical era) and D(legal adulthood), "A" would be returned for "information" and "B", "C", and "D" would be returned for "age". The individual translations are then combined to form each possible combination. Using the example above, this results in compositionally created translation candidates "AB", "AC", and "AD".

A search is then performed on a target language corpus, such as target language web pages 312 available through Internet 304, to determine the number of times each compositionally created translation appears in the target corpus. All of the compositionally created candidates that appear at least once in the corpus are kept as translation candidates and the rest are discarded.

In another embodiment, candidate translations for the source phrase are identified by searching a target language corpus, such as target language web pages 312, for the source phrase itself. In many target language documents, source language phrases may appear in brackets or parenthesis after the target language translation of the source phrase. Thus, if a source phrase is found in a target language document, target translation candidates can be formed by grouping the words or characters that precede the source phrase into candidate translations. For example, if a sequence of five Chinese characters "ABCDE" preceded a source phrase in a Chinese text, target translation candidates of "E", "DE", "CDE", "BCDE", and "ABCDE" would be formed. As above, a search for each of these possible target translation candidates can be performed on the target language corpus so that candidates that do not occur frequently can be discarded.

Once the candidate translations have been identified at step 204, the contexts in which each of the candidate translations are found in the target language corpus are used to construct a separate target language frequency vector 314 for each candidate at step 206. As with the source language frequency vectors, each element in a target language frequency vector represents the number of times a single word was found as a context word. The contexts for the candidates can be retrieved when determining if a candidate translation occurs frequently enough to remain under consideration at step 204.

At step 208, an Expectation-Maximization (EM) algorithm is used by an EM trainer 316 to identify a translation frequency vector 318. Translation frequency vector 318 is a transform of the source language frequency vector into a vector in the target language. In terms of an equation:

$$f_E(c) = P(c) \sum_{e \in E} f(e) \qquad \text{Eq. 1}$$

where f(e) is one element in the source language frequency vector that indicates the frequency with which word e of the source language appears as a context word for the source phrase, E is the set of all words in the source language, c is a word in the target language, P(c) is the prior probability of the word c in the target language, and $f_E(c)$ is one element in the translation frequency vector.

Equation 1 is performed for each word c in the set of all possible target language words C to provide the complete translation frequency vector.

To determine the prior probability, P(c), the present invention utilizes an EM algorithm. Under embodiments of the present invention, the EM algorithm is based on the assumption that each instance of a context word is independently generated according to a distribution defined as:

$$P(e) = \sum_{c \in C} P(c) P(e \mid c) \qquad \text{Eq. 2}$$

where P(e) is the probability of a word e in the source language, P(c) is the prior probability of a word c in the target language, and P(e|c) is the conditional probability of source language word e given target language word c.

Using the assumption of Equation 2, the E-step is defined as:

$$P(c \mid e) \leftarrow \frac{P(c) P(e \mid c)}{\sum_{c \in C} P(c) P(e \mid c)} \qquad \text{Eq. 3}$$

and the M-Step is defined as:

$$P(c) \leftarrow \sum_{e \in E} f(e) P(c \mid e) \qquad \text{Eq. 4}$$

$$P(e \mid c) \leftarrow \frac{f(e) P(c \mid e)}{\sum_{e \in E} f(e) P(c \mid e)} \qquad \text{Eq. 5}$$

where f(e) is a source frequency vector element for the source phrase and P(c|e) is the conditional probability of a word c in the target language given a word e in the source language. Before beginning the EM algorithm, the values used in the E-step are initialized for all words c in the source language C, c∈C as:

$$P(c) = \frac{1}{|C|} \qquad \text{Eq. 6}$$

$$P(e \mid c) = \begin{cases} \frac{1}{|\Gamma_c|}, & \text{if } e \in \Gamma_c \\ 0, & \text{if } e \notin \Gamma_c \end{cases} \qquad \text{Eq. 7}$$

where |C| is the number of words in the source language, $\Gamma_c$ is the set of source language translations for target language word c, and $|\Gamma_c|$ is the number of source language translations for target language word c. The set of source language translations is determined from translation dictionary 310. Since each target language word may have multiple source language words, the EM algorithm is based on multiple possible translations for context words.

After initialization, the E-step and the M-step are iterated until the parameters converge. The prior probability and the source frequency vector 306 are then used in Equation 1 to generate translation frequency vector 318.

At step 210, translation frequency vector 318 and target frequency vectors 314 are used by a translation selection module 320 to select one candidate translation as the translation 322 for the source phrase.

Under one embodiment, the selection is made using a Naïve Bayesian Classifier to select a candidate translation $\tilde{c}$ with the largest posterior probability, $P(\tilde{c}|D)$, where D is the translation frequency vector $D = (f_E(c_1), f_E(c_2), \ldots, f_E(c_n))$. Based on Bayes' rule and the assumption that the data in D are independently generated from $P(c|\tilde{c}), c \in C$, finding the maximum posterior probability comprises finding the translation that maximizes the following function:

$$\log P(\tilde{c}) + \sum_{c \in C} f_E(c) \log P(c \mid \tilde{c}) \qquad \text{Eq. 8}$$

or equivalently, finding the translation that minimizes:

$$-\alpha \log P(\tilde{c}) - \sum_{c \in C} f_E(c) \log P(c \mid \tilde{c}) \qquad \text{Eq. 9}$$

where α is an additional parameter used to emphasize prior information, which under one embodiment is set to 5, $f_E(c)$ is an element of the translation frequency vector 318, the prior probability, $P(\tilde{c})$, is estimated by using the document frequencies of the translation candidates in the target language corpus, and the conditional probability is defined as:

$$P(c \mid \tilde{c}) = \frac{f_{\tilde{c}}(c)}{\sum_{c \in C} f_{\tilde{c}}(c)} \qquad \text{Eq. 10}$$

where $f_{\tilde{c}}(c)$ is an element of the target frequency vector for target word c and translation candidate $\tilde{c}$.

Thus, using the translation frequency vector determined through the EM algorithm and Equation 9, the present invention is able to identify a most likely translation for the source phrase.

In further embodiments of the present invention, an ensemble of the Naïve Bayesian Classifier is used. Specifically, the ensemble is defined as:

$$P(\tilde{c} \mid D) = \frac{1}{s} \sum_{i=1}^{s} P(\tilde{c} \mid D_i) \qquad \text{Eq. 11}$$

where each $D_i$ represents a frequency vector for a different context with a different window size. Thus, one $D_i$ may be for a context of four words and one $D_i$ may be for a context of six words. Under the ensemble embodiment, selecting a candidate translation under equation 9 involves finding the candidate translation that minimizes:

$$\frac{1}{s}\sum_{i=1}^{s}\left(-\alpha\log P(\tilde{c}) - \sum_{c\in C} f_{Ei}(c)\log P(c\mid \tilde{c})\right) \qquad \text{Eq. 12}$$

where a separate translation frequency vector $f_{Ei}(c)$ is provided for each context length by repeating the EM training for each context length separately.

In other embodiments, the best candidate translation is selected at step 210 by creating TF-IDF vectors (Term Frequency/Inverse Document Frequency Vectors) based on the translation frequency vector and the target frequency vectors and comparing the TF-IDF vectors to find the TF-IDF target frequency vector that best matches the TF-IDF translation frequency vector.

Under such an embodiment, selection module 320 constructs the TF-IDF vectors by first determining an inverse document frequency value (idf(c)) for each word in the target language using:

$$idf(c) = -\log(df(c)/F) \qquad \text{Eq. 13}$$

where df(c) is the document frequency of target word c and F is the total document frequency.

Using the inverse document frequency values, the translation frequency vector becomes:

$$A = (f_E(c_1)idf(c_1), f_E(c_2)idf(c_2), \ldots, f_E(c_n)idf(c_n)) \qquad \text{Eq. 14}$$

and the target frequency vector for candidate $\tilde{c}$ becomes:

$$B = (f(c_1)idf(c_1), f(c_2)idf(c_2), \ldots, f(c_n)idf(c_n)) \qquad \text{Eq. 15}$$

where terms such as $f(c_1)idf(c_1)$ indicate the product of $f(c_1)$ and $idf(c_1)$.

With the TF-IDF vectors defined, the candidate translation is selected by selecting the candidate translation that maximizes the cosine of the angle between the two vectors. In other words, the candidate is selected by selecting the candidate with the maximum value for $tfidf(\tilde{c})$, defined as:

$$tfidf(c) = \cos(A, B) \text{ where} \qquad \text{Eq. 16}$$

$$\cos(A, B) = \frac{a_1 b_1 + a_2 b_2 + \ldots + a_n b_n}{\sqrt{a_1^2 + a_2^2 \ldots + a_n^2} \cdot \sqrt{b_1^2 + b_2^2 \ldots + b_n^2}} \qquad \text{Eq. 17}$$

In a further embodiment of the present invention, the EM algorithm forms part of a back-off technique. Under this embodiment, the target corpus is searched to find the source phrase. If the source phrase is found, the target words preceding the source phrase are used as the translation of the source phrase. If the source phrase cannot be found in the target corpus, candidate translation are formed using the compositional technique described above, and the EM algorithm is invoked to select a most likely candidate translation as the translation for the source phrase.

Note that although the techniques described above are used to find a translation for a source phrase, in other embodiments these techniques are used to find strings of text in a target corpus that match a string of text in a source language. In particular, the techniques described above can be used to locate pages that contain text in the target language that is relevant to a search string in the source language. This is done by converting the search string into a context vector, using the EM algorithm to form a translation context vector, and comparing the translation context vector to target context vectors that are formed from strings in the target corpus.

A second aspect of the present invention updates a translation dictionary based on feedback from multiple users. A method and system for performing this system are shown in the flow diagram of FIG. 4 and the block diagram of FIG. 5, respectively.

Figure 4:
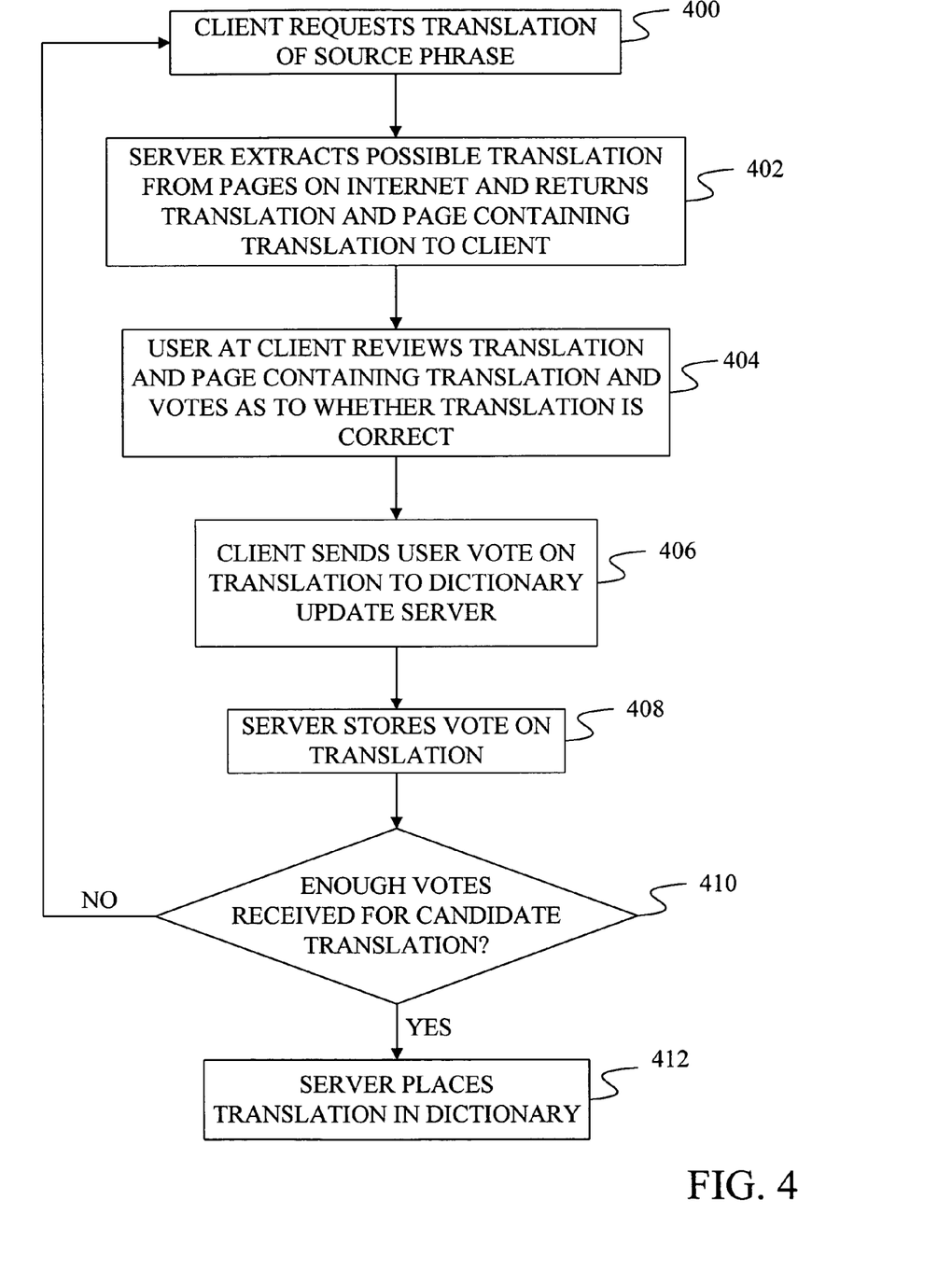
FIG. 4 is a flow diagram of a method of allowing multiple users to vote on a translation before updating a translation dictionary.
Figure 5:
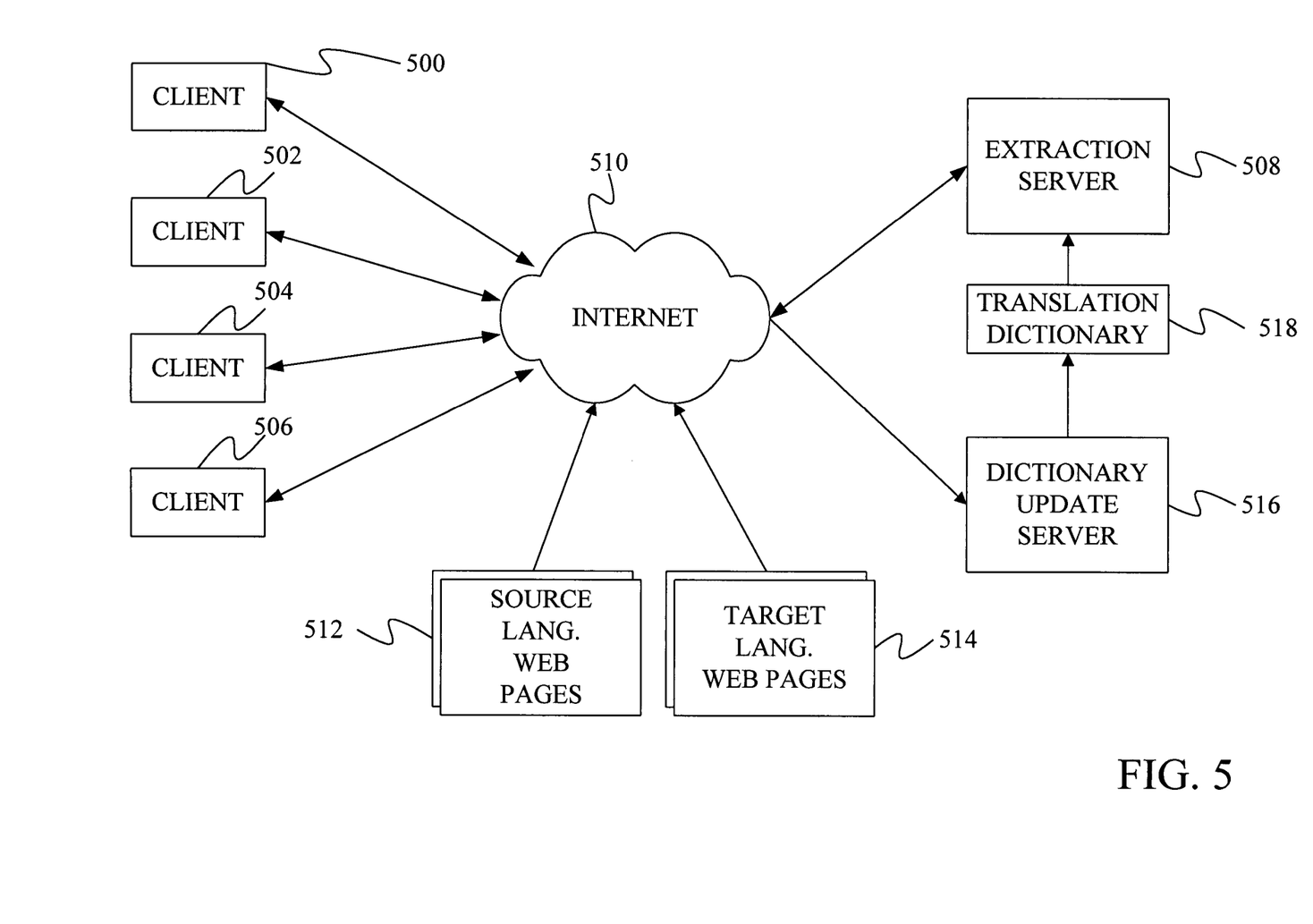
FIG. 5 is a block diagram of one embodiment of a system that allows multiple users to vote on a translation before updating a translation dictionary.

At step 400 of FIG. 4, one of a plurality of clients such as clients 500, 502, 504, and 506 requests a translation from an extraction server 508 through a network connection such as Internet 510. Extraction server 508 looks for the translation of the source phrase in a translation dictionary 518. If the dictionary does not have a translation for the source phrase, extraction server 508 extracts possible translations from pages connected to the Internet, such as source language pages 512 and target language pages 514, at step 402.

One technique for extracting the translation includes returning a page identified through a compositional technique as discussed above without performing the EM algorithm to determine if the translation is a best candidate. Alternatively, the translation can be extracted by finding the source language phrase in a target language page as discussed above without performing the EM algorithm to determine if the translation is a best candidate. A further alternative is to perform one of the EM-based algorithms discussed above to identify a most likely translation candidate.

Figure 6:
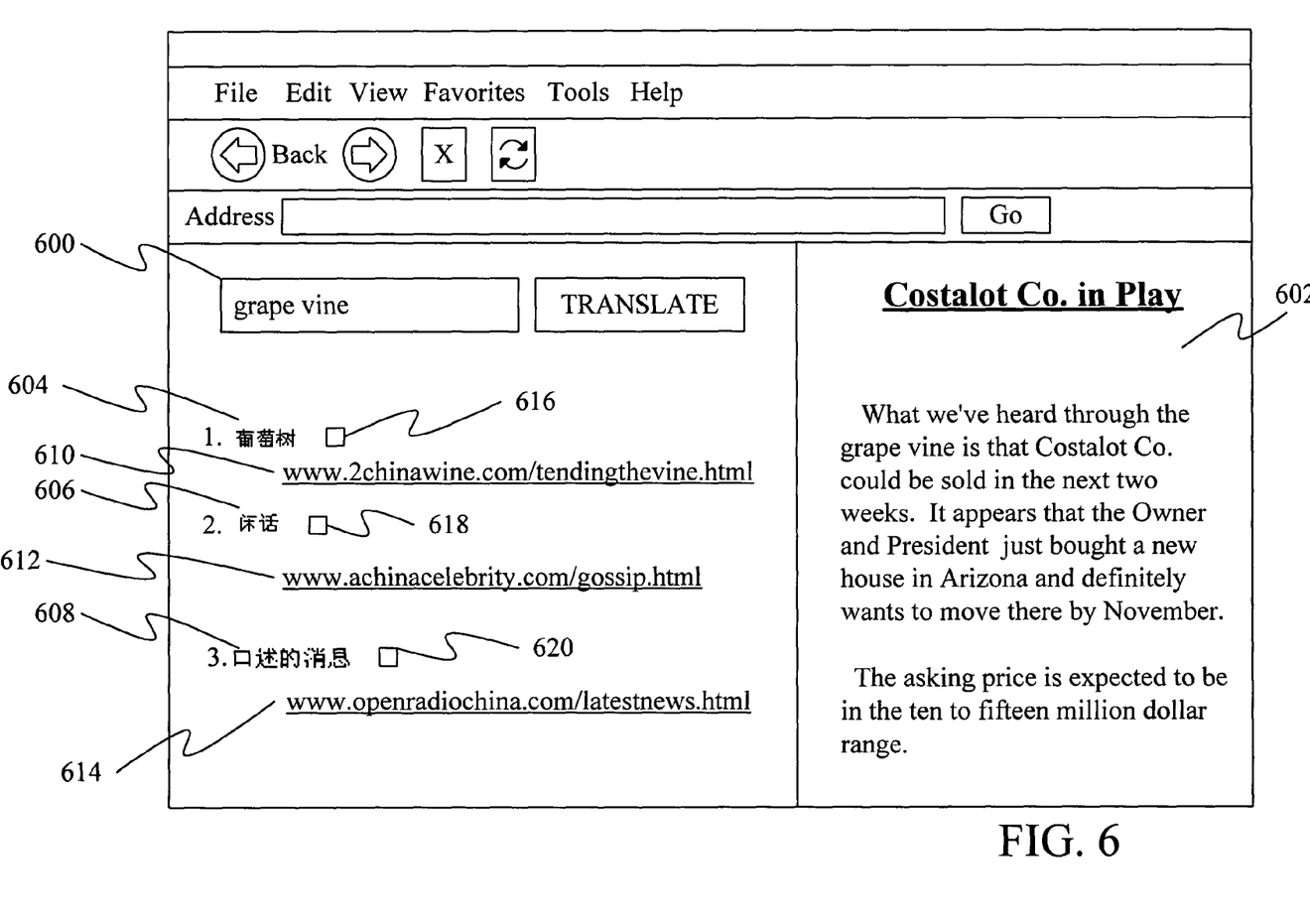
FIG. 6 is an example of a web page under one embodiment of the present invention that allows users to vote for candidate translations.

As part of step 402, the extracted translation candidate and the page that it appears on are returned to the client that requested the translation. Under one embodiment, this information is returned as a web page such as the web page of FIG. 6. In FIG. 6, the word to be translated is input in an input box 600 by a user who has found the word in a Web Page 600 and wants its translation. A list of translations has been returned to the user. This list includes candidate translations 604, 606, and 608. The candidate translations are accompanied by links 610, 612, and 614, respectively, which provide links to web pages where the translation was found. This allows the user to view the candidate translation in a context so that they can make a more informed decision when selecting one of the candidate translations.

At step 404, the user at the client reviews the translations and the pages that the translations are found on and votes as to whether the translation is correct. To vote for a candidate translation, the user marks one of the check boxes 616, 618, or 620, next to the correct translation. The client sends this user vote back to a dictionary update server 516 at step 406. Optionally, the client also updates a local translation dictionary stored on the client based on the user's selection.

Note that although dictionary update server 516 is shown as a separate server from extraction server 508 in FIG. 5, the functions of these two servers may be combined in a single server under some embodiments of the present invention.

Dictionary update server 516 stores the vote at step 408 and at step 410 determines if the candidate translation has received enough votes to qualify for placement in translation dictionary 518. If dictionary update server 516 has not received enough votes at step 410, it returns to step 400 and waits for another client request for a translation of the source phrase.

After dictionary update server 516 has received enough votes at step 410, it places the candidate translation in translation dictionary 518 at step 412.

Thus, the invention of FIGS. 4 and 5 use feedback from multiple users to select between candidate translations that are extracted from pages on a network such as the Internet. This automates the incremental updating of the translation dictionary without requiring a single user to be responsible for making decisions between candidate translations. This is thought to provide more robust translation selection and better dictionary updates. Note that in some embodiments, users are prevented from entering multiple votes for a translation. This is done to help prevent malicious attacks on the translation dictionary.

Although the present invention has been described with reference to particular embodiments, workers skilled in the art will recognize that changes may be made in form and detail without departing from the spirit and scope of the invention.

What is claimed is:

1. A method of identifying a translation in a target language for at least one source word in a source language, the method comprising:
    transforming a representation of context words in the source language into a transformed representation of context words in the target language based in part on multiple different translations for at least one context word in the target language;
    determining candidate representations of context words for at least two candidate translations in the target language;
    using the transformed representation to score each candidate representation; and
    selecting a candidate translation based on the scores for the candidate representations.

2. The method of claim 1 wherein the representation of context words in the source language comprises a frequency vector wherein each element in the frequency vector comprises a count of the number of times a respective word in the source language appears as a context word for the at least one source word.

3. The method of claim 2 wherein transforming the representation of context words in the source language comprises using a probability of a word in the target language.

4. The method of claim 3 wherein the probability of the word in the target language is trained using an iterative algorithm.

5. The method of claim 4 wherein the iterative algorithm utilizes a probability that is based in part on entries in a translation dictionary.

6. The method of claim 4 wherein the iterative algorithm comprises an expectation-maximization algorithm.

7. The method of claim 3 wherein transforming the representation of context words in the source language comprises forming a frequency vector as the transformed representation.

8. The method of claim 3 wherein transforming the representation of context words in the source language comprises forming a term frequency-inverse document frequency vector.

9. The method of claim 8 wherein each candidate representation comprises a term frequency-inverse document frequency vector.

10. The method of claim 1 wherein the transformed representation comprises a vector and each candidate representation comprises a vector and using the transformed representation to score each candidate representation comprises determining the cosine of the angle between the transformed representation vector and each candidate representation vector.

11. The method of claim 1 wherein using the transformed representation to score each candidate representation comprises determining a score using a function that is based on the transformed representation and the candidate representation.

12. The method of claim 11 wherein the candidate representation comprises a probability of a context word in the target language given a candidate translation.

13. A computer-readable storage medium having computer-executable instructions for performing steps comprising:
    receiving a string of words in a source language wherein receiving a string of words comprises identifying multiple strings of words, each string representing a context for a word in the source language;
    transforming the string of words into a transformed representation using an iterative algorithm;
    using the transformed representation to score strings of words in the target language.

14. The computer-readable storage medium of claim 13 further comprising selecting a string of words in the target language based on the score.

15. The computer-readable storage medium of claim 14 further comprising identifying pages containing the selected string of words in the target language as relevant to the string of words in the source language.

16. The computer-readable storage medium of claim 13 wherein transforming the string of words comprises forming a frequency vector from the strings of words and transforming the frequency vector into a transformed frequency vector.

17. The computer-readable storage medium of claim 16 wherein using the transformed representation to score a string of words in the target language comprises determining a probability for each word in the string of words in the target language and using the probabilities for the words and the transformed frequency vector to score the string of words in the target language.

18. The computer-readable storage medium of claim 16 wherein using the transformed representation to score a string of words in the target language comprises forming a target frequency vector based on the string of words and using the target frequency vector and the transformed frequency vector to score the string of words.

19. The computer-readable storage medium of claim 18 wherein using the transformed representation to score a string of words in the target language comprises forming a single score for multiple strings of words in the target language.

20. The computer-readable storage medium of claim 16 wherein transforming the string of words further comprises forming a transformed term frequency-inverse document frequency vector based in part on the frequency vector.

21. The computer-readable storage medium of claim 20 wherein using the transformed representation to score a string of words in the target language comprises forming a target term frequency-inverse document frequency vector based in part on the string of words and using the transformed term frequency-inverse document frequency vector and the target term frequency-inverse document frequency vector to score the string of words.

22. The computer-readable storage medium of claim 13 wherein the iterative algorithm is an expectation-maximization algorithm.

23. A method of updating a translation dictionary, the method comprising:

provide two possible translations for a word to at least two clients;

receiving an indication from each of the clients as to which translation was deemed correct;

using the indications from the clients to select one of the translations for entry in a translation dictionary.

24. The method of claim 23 wherein providing a possible translation comprises examining a page on a network to find a possible translation for a word.

25. The method of claim 24 further comprising providing a link to a page containing the possible translation along with the possible translation.

26. The method of claim 23 wherein providing the at least two possible translations to a client further comprises receiving a request from the client for a translation of a word before providing the at least two possible translations.

27. The method of claim 23 wherein using an indication from the client to select at least one translation comprises determining if a translation was deemed correct more than a threshold number of times.

28. The method of claim 23 further comprising not using an indication from a client to select a translation if the client has provided more than a threshold number of indications for a translation.

29. A computer-readable storage medium having computer-executable instructions for performing steps comprising:

serving a page to a client to solicit a source phrase from the client;

receiving the source phrase from the client;

accessing pages though a network to identify translations for the source phrase;

returning a page comprising a plurality of candidate translations for the source phrase and for each candidate translation, a page identifier that identifies the page that contains the translation to the client;

receiving an indication that one of the plurality of candidate translations has been selected on the client as a proper translation of the source phrase; and using the indication to determine whether to add the selected translation to a translation dictionary accessed by a server.

30. The computer-readable storage medium of claim 29 further comprising updating a translation dictionary used by the client based on the selected translation.

31. The computer-readable storage medium of claim 29 wherein accessing pages through a network comprises accessing web pages through the Internet.

32. The computer-readable storage medium of claim 31 wherein the page identifier is a link to a web page that contains the translations.

33. The computer-readable storage medium of claim 29 further comprising receiving the source phrase form multiple clients, returning at least two candidate translations to each client, receiving an indication as to whether the client accepts a candidate translation as a proper translation from multiple clients, and using the multiple indications to determine whether to add a translation to a translation dictionary.

* * * * *